US008304003B1

(12) United States Patent
Sanders

(10) Patent No.: US 8,304,003 B1
(45) **Date of Patent: *Nov. 6, 2012**

(54) OVENABLE CORRUGATED PAPER CONTAINER

(75) Inventor: Scott Sanders, Loveland, OH (US)

(73) Assignee: The Ovenable Paper Pan Company, LLC, Glenwillow, OH (US)

(*) Notice: Subject to any disclaimer, the term of this patent is extended or adjusted under 35 U.S.C. 154(b) by 147 days.

This patent is subject to a terminal disclaimer.

(21) Appl. No.: 12/607,537

(22) Filed: Oct. 28, 2009

Related U.S. Application Data

(60) Division of application No. 11/215,421, filed on Aug. 30, 2005, now abandoned, which is a continuation-in-part of application No. 10/120,996, filed on Apr. 11, 2002, now abandoned.

(51) Int. Cl.
*B65D 81/34* (2006.01)

(52) U.S. Cl. ........ 426/113; 426/127; 426/394; 426/398; 426/403; 299/5.84; 299/406; 299/903

(58) Field of Classification Search .......... 426/112–114, 426/127, 394, 398, 403; 229/406–407, 902–903, 229/5.81, 5.84
See application file for complete search history.

(56) References Cited

U.S. PATENT DOCUMENTS 1,811,566 A * 6/1931 Scott ............................ 249/112
3,308,006 A * 3/1967 Kresse et al. ................ 428/186
3,861,576 A 1/1975 Tolaas et al.
3,924,013 A * 12/1975 Kane ............................ 426/523
4,026,458 A * 5/1977 Morris et al. .............. 229/182.1
4,147,836 A 4/1979 Middleton et al.
4,595,611 A 6/1986 Quick et al.
4,757,940 A 7/1988 Quick et al.
5,002,833 A 3/1991 Kinsey, Jr. et al.
5,075,360 A * 12/1991 Fitt et al. ......................... 524/48
5,205,473 A 4/1993 Coffin, Sr.
5,231,268 A 7/1993 Hall et al.
5,352,465 A * 10/1994 Gondek et al. .................. 426/87
5,494,716 A 2/1996 Seung et al.
5,500,191 A 3/1996 DeMatte
5,543,606 A * 8/1996 Gics .............................. 219/730
5,575,418 A * 11/1996 Wu et al. ...................... 229/5.81
5,603,996 A 2/1997 Overcash et al.
5,665,295 A 9/1997 Takamoto et al.
5,697,550 A 12/1997 Varano et al.

(Continued)

FOREIGN PATENT DOCUMENTS

AU 199333903 A1 9/1993

OTHER PUBLICATIONS

Professional Baking 2nd Edition, Wayne Gisslen, 1994, John Wiley & Sons Inc., p. 36.*

(Continued)

*Primary Examiner* — Drew E Becker

(74) *Attorney, Agent, or Firm* — Fay Sharpe LLP; Brian E. Turung

(57) ABSTRACT

Disclosed is an ovenable corrugated paper container containing at least an inner liner containing a first paper substrate and a polymeric coating on a food product side; an outer liner containing a second paper substrate; and a corrugated paper layer positioned between the inner liner and the outer liner. Due to its insulation properties, the ovenable corrugated paper container may be used as a serving container without the danger of causing burns.

15 Claims, 1 Drawing Sheet

U.S. PATENT DOCUMENTS 5,839,653 A 11/1998 Zadravetz
5,855,973 A 1/1999 Calvert et al.
6,068,897 A * 5/2000 Adur et al. .................. 428/34.2
6,103,802 A 8/2000 Zhang et al.
6,193,831 B1 2/2001 Overcash et al.
6,200,644 B1 * 3/2001 Ulfstedt et al. ............... 427/487
6,253,995 B1 * 7/2001 Blok et al. .................... 229/403
6,291,075 B1 9/2001 Zhang et al.
6,422,456 B1 7/2002 Sadlier
6,450,398 B1 * 9/2002 Muise et al. ................. 229/5.84
6,491,214 B2 * 12/2002 Plummer et al. .............. 229/406
6,639,199 B1 * 10/2003 Ross, Jr. ........................ 219/735
6,926,197 B2 * 8/2005 Hed et al. ...................... 229/403
7,000,825 B2 * 2/2006 Alexander et al. ............ 229/407
2002/0030296 A1 3/2002 Geddes et al.
2002/0036229 A1 3/2002 Muise et al.
2002/0179697 A1 * 12/2002 Pope ............................ 229/5.82
2003/0010817 A1 * 1/2003 Lingle et al. .................. 229/406
2003/0226882 A1 * 12/2003 Porchia et al. ................ 229/403
2003/0229180 A1 12/2003 Trent et al.
2005/0031834 A1 * 2/2005 Mason et al. ................. 428/182
2005/0048300 A1 3/2005 Mason
2010/0193578 A1 * 8/2010 Sanders ........................ 229/120

OTHER PUBLICATIONS

U.S. Appl. No. 60/303,488, filed Jul. 2001, Lingle et al.

* cited by examiner

OVENABLE CORRUGATED PAPER CONTAINER

This application is a divisional of U.S. patent application Ser. No. 11/215,421 filed Aug. 30, 2005 entitled OVENABLE CORRUGATED PAPER CONTAINER, now abandoned, which in turn is a continuation-in-part of U.S. patent application Ser. No. 10/120,996 filed Apr. 11, 2002 entitled OVENABLE CORRUGATED PAPER CONTAINER, now abandoned, which is incorporated herein by reference.

TECHNICAL FIELD

The subject invention generally relates to a corrugated paper container suitable for use in an oven. In particular, the subject invention relates to a cooking and serving corrugated paper container and methods of making and using the corrugated paper container.

BACKGROUND OF THE INVENTION

Many foods are prepared in an oven. Most often, such foods are placed on/in a metal baking container or a glass-baking container. Since metal and glass baking containers become extremely hot during the baking process, it is dangerous to use the metal or glass-baking container as a serving container immediately after removal from an oven. This is due to the threat of a burn injury if flesh comes in contact with the extremely hot metal or glass-baking container. Transferring food from a hot baking container to a temperate serving container can be cumbersome, particularly in a restaurant environment where food preparation and handling activities are mitigated to maximize delivery volume. Furthermore, metal and glass containers are relatively heavy and expensive. Another difficulty with metal containers is that they cannot be used in microwave oven cooking.

There is a growing market demand for disposable paperboard for use in baking applications with food products. However, many foods are difficult to successfully package because they have a tendency to stick to the paperboard when baked. This is especially true for food products containing higher levels of sugar. As sugar caramelizes upon heating, adherence to paperboard is particularly problematic.

SUMMARY OF THE INVENTION

The subject invention provides an ovenable corrugated paper container suitable for baking food products and immediately serving the food product without transferring the food product to a serving plate. Due to its insulation properties, the ovenable corrugated paper container may be immediately served without the danger of causing burns to those who handle the container.

One aspect of the invention relates to an ovenable corrugated paper container containing at least an inner liner containing a first paper substrate and a polymeric coating on a food product side; an outer liner containing a second paper substrate; and a corrugated paper layer positioned between the inner liner and the outer liner. The ovenable corrugated paper container may be seamless. The invention also relates to an article containing ovenable corrugated paper container and a food product.

Another aspect of the invention relates to method of making an ovenable corrugated paper container involving providing a sheet of a corrugated paper composite containing an inner liner containing a first paper substrate and a polymeric coating on a food product side, an outer liner containing a second paper substrate, and a corrugated paper layer positioned between the inner liner and the outer liner; die cutting the sheet into a shape; and forming the shaped sheet into the ovenable corrugated paper container under mechanical pressure and at least one of heat and steam.

Yet another aspect of the invention relates to a method of using an ovenable corrugated paper container involving charging a food product into the ovenable corrugated paper container, and heating the ovenable corrugated paper container containing the food product in an oven.

DETAILED DESCRIPTION OF THE INVENTION

Figure 1:
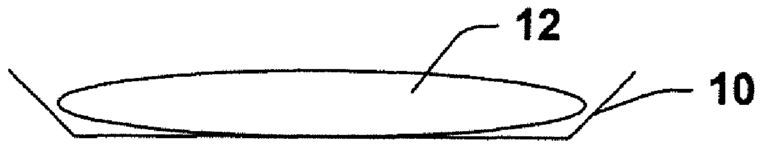
FIG. 1 is a cross-sectional side view of an ovenable corrugated paper container holding a food item in accordance with an aspect of the subject invention.

An ovenable corrugated paper container is made from sheets of a corrugated paper composite. The corrugated paper composite contains at least three layers; namely, a food contact layer or inner liner, a medium or fluted layer, and an outer liner that may have a printable surface. The corrugated paper composite may contain additional layers. While each of the three layers contains a paper substrate, the inner liner has a polymeric coating, the medium is treated or untreated, and the outer layer is optionally treated so that it has a printable surface. The inner liner, fluted layer, and outer liner may be adhered to one another using an adhesive.

The paper substrate can be made of cellulosic materials. Examples of cellulosic materials include kraft paper, virgin kraft paper, sulfite paper, recycled paper, and the like. Bleached or unbleached paper may be employed. Paper substrates are available from a number of sources including Mead/Westvaco Corporation, Georgia Pacific, International Paper, Interstate, Caraustar, and the like.

The food contact layer or inner liner has a polymeric coating on at least the side which contacts a food product that is subsequently held within the ovenable corrugated paper container. The polymeric coating may also be present on the side of the inner liner which is in contact with the fluted layer. The cellulosic material or paper substrate for the inner liner is of a weight/size sufficient to support a polymeric coating and contain optional embossing. The cellulosic material or paper substrate for the inner liner is selected to have good resistance to conventional and microwave oven heating as well as low levels of contaminants which may inhibit adhesion of the polymeric coating.

In one embodiment, the inner liner (with polymeric coating) has a weight of about 25 pounds per thousand square feet (P/MSF) or more and about 150 P/MSF or less. In another embodiment, the inner liner has a weight of about 35 P/MSF or more and about 125 P/MSF or less. In yet another embodiment, the inner liner has a weight of about 50 P/MSF or more and about 100 P/MSF or less.

The polymeric coating of the inner liner mitigates heat-induced warpage of the subsequently formed ovenable corrugated paper container. The polymeric coating provides the subsequently formed ovenable corrugated paper container with food release properties. Examples of polymeric coatings include polymethylpentene (PMP), styrene-acrylic latex copolymers, polyesters such as polyethylene terephthalate (PET) and polybutylene terephthalate (PBT), and polyolefins such as polyethylene, polypropylene, polyethylene-polypropylene copolymers, and polybutylene, polyimides, polyamides, urethanes, silicones, polysulfones, and the like. Optionally, the polymeric coating also contains one or more adjuvants/additives/layers for improving the physical and/or mechanical properties of the ovenable corrugated paper container.

The polymeric coating may be applied to a paperboard substrate in any suitable manner. Examples include extrusion/coextrusion, spraying, pouring, dipping, immersing, molding, and the like.

The polymeric coating may be applied to a paperboard substrate via extrusion optionally incorporating unique tie resins, oil and grease barrier resin layers, and the like. The extrusion laminate is directly applied to the paperboard substrate via conventional extrusion techniques at conventional extrusion coating temperatures. The polymeric coating layer is extruded as a single layer, or part of a multi-layer coextrusion with a barrier layer which enhances the oil and grease resistance of the coating. Optionally binding the oil and grease barrier layer to the polymeric layer is a tie resin.

In one embodiment, the inner liner is a paperboard based laminate structure having a paperboard substrate and a PMP layer thereon. The PMP is extruded onto the paperboard substrate. The paperboard may be preheated or subject to corona discharge treatment just prior to the extrusion application in order to improve adhesion. The paperboard may also be moistened prior to the extrusion application.

In another embodiment, the inner liner is a paperboard based laminate structure having a paperboard substrate and a five layer polymeric coating coextruded thereon. The coextruded layer is made up of a first layer of PMP which is in direct contact with the paperboard substrate, a first tie layer adjacent the first PMP layer, the first tie layer binding an oil and grease barrier layer to first PMP layer. Placed adjacent the oil and grease barrier layer is a second tie layer and then a food contact layer or second PMP layer. The entire polymeric structure in this embodiment makes up a five-layer coextrusion.

Any suitable coextrudable oil and grease barrier resin can be selected for the subject invention such as polyamide resins, copolyamide resins such as the nylon resins, polyester resins or copolyester resins. Additionally, the tie resin suitable for the subject invention may be a chemically modified graft copolymers of methylpentene.

In yet another embodiment, a three-layer coextrusion is coated to provide a paperboard laminate structure having a paperboard substrate. The three-layer coextrusion contains oil and grease barrier layer next to the paperboard substrate, an adhesive tie resin layer on the barrier layer, and a layer of PMP which acts as the food contact layer. An example of a commercially available PMP polymer resin is TPX manufactured by Mitsui Petrochemical Corporation.

In still yet another embodiment, the inner liner is a paperboard based laminate structure having a paperboard substrate and a PET layer thereon. The PET is extruded onto the paperboard substrate. The paperboard may be preheated or subject to corona discharge treatment just prior to the extrusion application in order to improve adhesion. The paperboard may also be moistened prior to the extrusion application.

In still yet another embodiment, the inner liner is a paperboard based laminate structure having a paperboard substrate and a PBT layer thereon. The PBT is extruded onto the paperboard substrate. The paperboard may be preheated or subject to corona discharge treatment just prior to the extrusion application in order to improve adhesion. The paperboard may also be moistened prior to the extrusion application.

In another embodiment, the inner liner contains a paperboard substrate coated with an aqueous coating composition containing at least one styrene-acrylic latex copolymer. The aqueous coating composition may optionally further contain a stearate and/or a silicone. The aqueous coating composition may also be applied to the surface of other coatings.

The aqueous coating formulations of this embodiment may contain water; an aqueous latex containing a relatively soft free carboxyl group-containing styrene-acrylic resin having a low glass transition temperature ($T_g$) from about 20° C. to about 80° C.; and/or an aqueous latex containing a relatively hard carboxyl group-containing styrene-acrylic resin having a high glass transition temperature ($T_g$) from about 55° C. to about 80° C.

An example of a low $T_g$ carboxyl group-containing styrene-acrylic latex is B.F. Goodrich's Carboset XPD-1103, ($T_g$ of about 20° C.), whereas an exemplary high $T_g$ carboxyl group-containing styrene-acrylic latex is B.F. Goodrich's Carboset XPD-1105, ($T_g$ of about 55° C.). The relative amounts of low and high $T_g$ styrene-acrylic latexes that are used are dependent upon the particular latexes that are employed.

In one embodiment, the aqueous coating composition contains from about 0 to about 100 wt. % low $T_g$ styrene-acrylic latex (based on the weight of the resin solids (BORS) in the total formulation) and from about 100 wt. % to about 0 wt. % BORS of the high $T_o$ styrene-acrylic latex, wherein each of the styrene-acrylic latexes contain at least about 50 wt. % resin solids. In another embodiment, the aqueous coating composition contains from about 30 wt. % to about 70 wt. % low $T_g$ styrene-acrylic latex BORS and from about 70 wt. % to about 30 wt. % BORS of the high $T_g$ styrene-acrylic latex, wherein each of the styrene-acrylic latexes contain at least about 50 wt. % resin solids. Typically, the aqueous coating formulations are processed at temperatures between about 220° F. and 300° F.

In another embodiment, the aqueous coating compositions contain:

A) from about 20 to about 50 wt. % (based on the total weight of the solids in the coating composition or BOS) of one or more of the styrene-acrylic latex copolymer addition polymerization reaction products of 1) from about 60 to about 90 wt. % (based on the total weight of the polymer or BOP) of at least one nonionic free radical polymerizable monomer, 2) up to about 5 wt. % BOP of at least one acidic free radical polymerizable monomer, and 3) from about 40 to about 10 wt. % BOP of at least one alkali-soluble stabilizing resin having an acid number of at least 150 mg KOH/g, wherein the reaction products have a glass transition temperature in a range from about −30° C. to about 60° C.;

B) from about 80 to about 50 wt. % BOS of one or more of calcium stearate and zinc stearate;

C) up to about 5 wt. % BOS of silicone; and

D) the balance water.

In this embodiment, the styrene-acrylic latex copolymers have a $T_g$ between about −40° C. and about 50° C.

In embodiments where the polymeric coating contains a styrene-acrylic latex copolymer, monomers which may be used include ethylenically unsaturated monomers such as olefins, monovinylaromatics, alpha, beta-ethylenically unsaturated carboxylic acids and esters thereof, ethylenically unsaturated dicarboxylic anhydrides (or acids) and esters thereof, and halo substituted olefinics. Specific examples of these monomers include styrene, alpha-methylstyrene, acrylic acid, methacrylic acid, methyl methacrylate, butyl methacrylate, butyl acrylate, 2-ethylhexyl acrylate, ethyl acrylate, hydroxyethyl acrylate, hydroxyethyl methacrylate, isobutyl methacrylate, itaconic acid, and combinations thereof. The alkali-soluble stabilizing resin may be a styrene/maleic anhydride copolymer.

Addition polymerization reactions are well known to those skilled in the art. The type of free-radical polymerization initiator suitable for use in the addition polymerization reaction to produce the styrene-acrylic latex copolymer is known in the art to depend upon the desired temperature for the reaction. Suitable initiators include t-butyl peroxide, t-butyl peroxybenzoate, t-butyl peroctoate, cumene hydroperoxide, azobisisobutyronitrile, benzoyl peroxide, ammonium persulfate and combinations thereof.

The pH at which the styrene-acrylic latex copolymers are prepared may affect their stability. The pH range for use in the addition polymerization reaction is from about 7 to about 11. While PMP, PET, and PBT may be preferably applied by extrusion, the aqueous coating compositions may be applied using blades, air knifes, rod coaters and the like.

The polymeric coating may be applied to either or both sides of the paper substrate. For example, the polymeric coating is applied to a paperboard substrate by means of a blade, air knife or rod coater using coating weights in the range from about 0.1 to about 20 P/MSF. In another embodiment, the polymeric coating is applied to a paperboard substrate using coating weights in the range from about 1 to about 15 P/MSF. In yet another embodiment, the polymeric coating is applied to a paperboard substrate using coating weights in the range from about 2 to about 12 P/MSF.

Additives and adjuvants to the polymeric coating/inner liner include, for example, thickening agents, coalescent solvents (such as polyols), waxes, defoaming/dispersing agents, pigments, colorants, agents for improving the food release, grease barrier, water barrier, blocking resistance, crease-resistance, pH adjusters (such as aqueous ammonia), and agents for improving other properties of the ovenable corrugated paper container. In one embodiment, these adjuvants are denoted GRAS for direct food contact under Food and Drug Administration guidelines.

Coalescent solvents include, for example, a food grade polyol such as propylene glycol or glycerine, which facilitates lowering the minimum film forming temperature of the polymeric coating. When present, the coalescing solvent may be used in amounts up to about 20% by weight.

Thickeners and other rheology modifying agents can be added in amounts up to about 2 wt. %. Suitable thickeners include, for example, GRAS acrylic polymers, such as polyacrylic acid (such as Rohm & Haas Co. Acrysol ASE-60, an acrylic copolymer emulsion); clays, such as Bentonite; and cellulosics (carboxylmethylcellulose).

The defoaming/dispersing agent functions primarily to reduce the number of bubbles in the polymeric coating and are present up to about 1 wt. %. Examples of defoaming/dispersing agents include Colloid 963, a proprietary composition available from Rhone-Poulenc.

The polymeric coating may further contain up to about 15 wt. % of a food grade crosslinker, such as the melamine-formaldehyde resin Cymel 373 (available from Cytec Industries); and up to about 40 wt. % of a food grade wax, such as that from the carnauba wax emulsion Michemlube 160 (available from Michelman, Inc.) to improve the food release properties of the ovenable corrugated paper container. Typically, the wax emulsion contains from about 15 wt. % to about 50 wt. % wax solids.

The outer liner has an optional coating on at least the side which smooths the surface and facilitates printing for a logo, instructions, or other decoration on the ovenable corrugated paper container. The cellulosic material or paper substrate for the outer liner is of a weight/size sufficient to support printing and an optional top coating to facilitate printing. The cellulosic material or paper substrate for the outer liner is selected to have good resistance to conventional and microwave oven heating.

In one embodiment, the outer liner (with optional top coating) has a weight of about 1 P/MSF or more and about 100 P/MSF or less. In another embodiment, the outer liner has a weight of about 5 P/MSF or more and about 85 P/MSF or less. In yet another embodiment, the outer liner has a weight of about 10 P/MSF or more and about 70 P/MSF or less.

The optional top coating additives are the various pigments. These pigments improve surface smoothness and uniformity. They also contribute to increased brightness, opacity and gloss for appearance, and to reduced ink show-through. Major pigments utilized include hydrous kaolin coating clays, fine calcined clay, trihydrated alumina, calcium carbonate, and titanium dioxide.

In order to hold the top coating containing pigments together and bond it to the paper substrate, various adhesives may be utilized. These include, for example, starch, casein and lattices. Coating binders affect gloss and ink holdout. The wet rub resistance of the top coating is also improved by the use of selected adhesives such as butadiene-styrene latex, butadiene-styrene, poly(vinyl acetate) (PVAc), and polyacrylic.

Dispersants promote and maintain the separation of individual pigment particles in the top coating. This group of additives reduces coating viscosities, enhances coating flow during the application process and contributes to improved coating lay on the paper substrate. Examples of dispersants include pentasodium tripolyphosphate, tetrasodium pyrophosphate, sodium tetraphosphate, casein, sodium silicate and sodium salts of carboxylic acids. Selection of a dispersant is largely determined by the type of pigments utilized in a specific top coating.

Top coating lubricants also improve coating flow properties, coating lay, surface finish and product printability. They reduce the tendency of the top coating to crack, and they prevent dusting. Examples of lubricants include sodium stearate, calcium stearate, sulfonated oils, and polyethylene emulsions. Specific examples include a water-based lubricant under the trade designation PCL500 available from Michelman, Inc. These lubricants may be diluted with water prior to use.

Insolubilizers are incorporated in top coatings to improve water resistance. These additives reduce the sensitivity of the adhesives to water and generally improve the wet rub resistance of the top coating. Examples of insolubilizers include urea resins, such as urea-formaldehyde, melamine resins, such as melamine-formaldehyde, and glyoxal.

Viscosity-reducing additives control, lower and stabilize the viscosity of adhesives or pigments in the top coating prior to application. Examples of viscosity-reducing additives include urea, dicyandiamide, and ethylenediamine. These compounds facilitate maintaining uniform flow properties in the coating operation. Viscosity-increasing additives build viscosity into coatings where the primary binder is latex. Additives such as sodium carboxy methylcellulose, which is also an adhesive, increase viscosity to improve runnability, coating lay, and uniformity of deposition. Other such additives include sodium alginate (such as Kelgin) and hydroxy ethylcellulose (HEC).

Paper top coatings are generally applied by blade coating or roll coating. The top coating formulations and methods are designed, in part, to aid blade-coating processes. The blade doctors off excess coating that has been picked up in the applicator pan. Sulfated tall oil fatty acid is known to be used as an additive in paper coating formulations and is believed to promote coating leveling.

Corrugated board can be prepared by a process known as the Stein-Hall process, although any suitable corrugation process may be employed. Corrugating machines are commercially available from the Bobst Group of companies. The Stein-Hall process employs a corrugating adhesive to bond a corrugated paper "medium," such as a roll or strip, to the out liner and/or inner liner. Adhesives that are used in conjunction with the Stein-Hall process are known, and such adhesives may contain one or more of an aqueous emulsion of raw starch, caustic, pasted modified or unmodified starch, and a cross-linking agent.

In one embodiment, the paper substrate used to form the medium or fluted layer has a weight of about 1 P/MSF or more and about 100 P/MSF or less. In another embodiment, the paper substrate used to form the medium or fluted layer has a weight of about 5 P/MSF or more and about 85 P/MSF or less. In yet another embodiment, the paper substrate used to form the medium or fluted layer has a weight of about 10 P/MSF or more and about 70 P/MSF or less. Preferably, the paper substrate is a semi-chem medium paper.

The flutes of the fluted layer may have any suitable size including A—about 5 mm; B—about 3 mm; C—about 4 mm; E—about 1.5 mm; F flute—about 1.2 mm; N, G, and Z, etc.

The corrugated paper composite is made by laminating the fluted layer to the inner liner and outer liner simultaneously, to the inner liner then the outer liner, or to the outer liner then the inner liner. An adhesive may be employed on the outer curves of the fluted layer, or on the binding surface of the outer/inner liners so that the three-layer corrugated paper composite remains together.

A wide range of starch-based adhesive compositions and biodegradable adhesives, for example, R130 adhesive by Fasson Inc., may be employed. For example, a typical starch-based adhesive containing water, starch, caustic soda (to modify carrier texture and/or gel point), and borax (as a carrier extender) can be used. Starch-based adhesives which can be of the carrier, no-carrier, and carrier-no-carrier type are used to make the three layer corrugated paper composite.

In carrier type adhesives, a portion of the starch forms a carrier, often known as the gelatinized phase, which suspends the balance of the starch which is in an ungelatinized state. Under conditions of heat and pressure, the ungelatinized starch is rapidly hydrated and gelatinized to increase quickly the viscosity and adhesivity of the adhesive composition. In no-carrier type adhesives, substantially all of the starch is slightly cooked or swollen with heat and caustic soda for viscosity. Finally, carrier-no-carrier type adhesives have a portion of the starch which forms a carrier and is responsible for about one half of the viscosity and the remaining viscosity is obtained by slightly swelling the uncooked starch. Adhesives containing sodium silicates and clay may also be employed.

In one embodiment, a dry preblended carrier starch for corrugating adhesives contains from about 70% to about 90% by weight modified starch, which is preferably in the form of oxidized starch but may also be in the form of dextrin, and from about 30% to about 10% by weight dry alkali in the form of sodium metasilicate or trisodium phosphate. The corrugating adhesive may also contain other components, fillers and bulking agents, and mineral oils to reduce dusting.

Starches derived from the root, stem or fruit of a number of plants can be used. Examples of suitable starch sources include, corn, wheat, potato, beet, tapioca, rice, sago and manioc. Other genetic forms of corn, such as high amylose and waxy corn as well as sorghum varieties are also be suitable. This list is by no means complete and starches may be derived from any farinaceous material.

Suitable chemically modified starches may be employed as the adhesive. Chemically modified starches include modified oxidized starch such as hypochloriteoxidized starch, acid-thinned starch, ethylated starch, cross-bonded starch, cationic starch, acetylated starch, starch monophosphates and others which have reduced molecular weight, higher fluidity and/or functional sub groups. Examples of chemically modified starches are commercially available from Surebond, Inc. or under the trade designation STABLEBOND™ modified starches which have residual carboxyl functionality and extreme uniformity and are available from Corn Products International, Inc.

The corrugated paper composite typically has three layers, although additional layers may be added. The additional layers may be fluted or flat layers. Any suitable size of the sheets of corrugated paper composite may be formed as the size is not critical.

Once the corrugated paper composite is formed, it may be embossed to provide indentations into the surface. Alternatively, the inner liner may be embossed prior to forming the corrugated paper composite. Still alternatively, die cut blanks (described below) may be embossed. Embossing may involve forming any suitable shape into the corrugated paper composite. Circles, squares, and rectangles are easily formed. The embossed shapes on the bottom of the ovenable corrugated paper container permit air to circulate underneath the food product held therein.

After sheets of the corrugated paper composite are formed, the sheets are die cut into blanks which are subsequently formed into a container shape. Die cutting methods are known. Flat bed or rotary dies may be employed. Scoring and cutting may be driven by a computer, contributing to uniform and consistent production. Any shape of blank may be formed, and typically depends upon the shape of the resultant ovenable corrugated paper container. For example, when forming an ovenable corrugated paper container having a pie crust shape, the shape of the blanks die cut is a circle. Oval, square, rectangular, triangular pans are further examples of ovenable corrugated paper containers The blanks of corrugated paper composite are converted into ovenable corrugated paper containers using a forming machine. The forming machine shapes or molds the blank into a container or pan shape under mechanical pressure and at least one of steam and heat for a sufficient period of time. The dwell time depends upon a number of factors, including the depth of the pan; the weights of the paper substrates employed for the inner, fluted, and outer layers; the temperature, and the like. Forming machines are available from a number of sources including Graylex and Peerless.

The blanks of corrugated paper composite may be shaped or molded into a container or pan shape by a thermoforming process. In such a process the blanks of corrugated paper composite are subjected to a thermoforming mold. The resultant corrugated paper container or pan may be a thermoformed corrugated paper container or pan. The blanks of corrugated paper composite may be placed between first and second dies having a mating protrusion and cavity in the desired shape.

The dies compress the blanks of corrugated paper composite under heat and pressure sufficient to deform the blanks of corrugated paper composite into a shape congruent with the dies. Upon retraction of the dies, the corrugated paper composite retains the desired shape. The edges of the corrugated paper composite may be trimmed or otherwise finished for the use. The blanks of corrugated paper composite can be shaped or molded into the container or pan shape by the thermoforming process before or after the polymeric coating is applied to the paper substrate.

Without the application of mechanical pressure and at least one of steam and heat (that is to say without thermoforming), the corrugated paper container may burn when exposed to elevated cooking temperatures. The application of mechanical pressure and at least one of steam and heat results in a corrugated paper container that can withstand oven cooking temperatures without burning, delaminating, and otherwise deforming.

The corrugated paper container or pan may have a one-piece seamless, unlapped structure. The corrugated paper container or pan needs no lapped joint to retain the desired shape because the container or pan is shaped or molded into the container or pan shape by the thermoforming process. Due to the seamless, unlapped construction of the corrugated paper container or pan, the container or pan may be leakproof or waterproof even when the container or pan is placed where the surrounding air is at elevated temperatures. Since the corrugated paper container is seamless, undesired wicking of liquid through a seem is avoided.

In one embodiment, the blanks of corrugated paper composite are converted into ovenable corrugated paper containers under a pressure of about 1,000 lbs. of force or more. In another embodiment, the blanks of corrugated paper composite are converted into ovenable corrugated paper containers under a pressure of about 10,000 lbs. of force or more. In yet another embodiment, the blanks of corrugated paper composite are converted into ovenable corrugated paper containers under a pressure of about 12,000 lbs. of force or more.

In one embodiment, the blanks of corrugated paper composite are converted into ovenable corrugated paper containers under a pressure of about 25,000 lbs. of force or less. In another embodiment, the blanks of corrugated paper composite are converted into ovenable corrugated paper containers under a pressure of about 20,000 lbs. of force or less. In yet another embodiment, the blanks of corrugated paper composite are converted into ovenable corrugated paper containers under a pressure of about 18,000 lbs. of force or less.

These parameters can be combined to provide a desired shape of the ovenable corrugated paper container, depending on, for example, the type of paperboard and adhesives, and the shape. For example, in one embodiment, the blanks of corrugated paper composite are converted into ovenable corrugated paper containers under a pressure of about 1,000 lbs. of force or more and about 25,000 lbs. of force or less. In another embodiment, the blanks of corrugated paper composite are converted into ovenable corrugated paper containers under a pressure of about 10,000 lbs. of force or more and about 20,000 lbs. of force or less. In yet another embodiment, the blanks of corrugated paper composite are converted into ovenable corrugated paper containers under a pressure of about 12,000 lbs. of force or more and about 18,000 lbs. of force or less.

In one embodiment, the blanks of corrugated paper composite are converted into ovenable corrugated paper containers at a temperature of about 30° C. or more. In another embodiment, the blanks of corrugated paper composite are converted into ovenable corrugated paper containers at a temperature of about 50° C. or more. In yet another embodiment, the blanks of corrugated paper composite are converted into ovenable corrugated paper containers at a temperature of about 75° C. or more.

In one embodiment, the blanks of corrugated paper composite are converted into ovenable corrugated paper containers at a temperature of about 300° C. or less. In another embodiment, the blanks of corrugated paper composite are converted into ovenable corrugated paper containers at a temperature of 250° C. or less. In yet another embodiment, the blanks of corrugated paper composite are converted into ovenable corrugated paper containers at a temperature of about 200° C. or less.

These parameters can be combined to provide a desired shape of the ovenable corrugated paper container, depending on, for example, the type of paperboard and adhesives, and the shape. For example, in one embodiment, the blanks of corrugated paper composite are converted into ovenable corrugated paper containers at a temperature of about 30° C. or more and about 300° C. or less. In another embodiment, the blanks of corrugated paper composite are converted into ovenable corrugated paper containers at a temperature of about 50° C. or more and about 250° C. or less. In yet another embodiment, the blanks of corrugated paper composite are converted into ovenable corrugated paper containers at a temperature of about 75° C. or more and about 200° C. or less.

In one embodiment, the blanks of corrugated paper composite are converted into ovenable corrugated paper containers while about 0% or more steam is injected into the mold cavity. The % steam refers to the amount of water vapor in air that is injected into the mold cavity as it collapses upon the blank of corrugated paper composite. In another embodiment, the blanks of corrugated paper composite are converted into ovenable corrugated paper containers while about 1% or more steam is injected into the mold cavity. In yet another embodiment, the blanks of corrugated paper composite are converted into ovenable corrugated paper containers while about 2% or more steam is injected into the mold cavity.

In one embodiment, the blanks of corrugated paper composite are converted into ovenable corrugated paper containers while about 50% or less steam is injected into the mold cavity. In another embodiment, the blanks of corrugated paper composite are converted into ovenable corrugated paper containers while about 25% or less steam is injected into the mold cavity. In yet another embodiment, the blanks of corrugated paper composite are converted into ovenable corrugated paper containers while about 10% or less steam is injected into the mold cavity. These parameters can be combined to provide a desired shape of the ovenable corrugated paper container, depending on, for example, the type of paperboard and adhesives, and the shape. For example, in one embodiment, the blanks of corrugated paper composite are converted into ovenable corrugated paper containers while about 0% or more and about 50% or less steam is injected into the mold cavity. In another embodiment, the blanks of corrugated paper composite are converted into ovenable corrugated paper containers while about 1% or more and about 25% or less steam is injected into the mold cavity. In yet another embodiment, the blanks of corrugated paper composite are converted into ovenable corrugated paper containers while about 2% or more and about 10% or less steam is injected into the mold cavity.

In one embodiment, the blanks of corrugated paper composite are converted into ovenable corrugated paper containers using a dwell time of about 0.01 seconds or more. In another embodiment, the blanks of corrugated paper composite are converted into ovenable corrugated paper containers using a dwell time of about 0.1 seconds or more. In yet another embodiment, the blanks of corrugated paper composite are converted into ovenable corrugated paper containers using a dwell time of about 0.2 seconds or more.

In one embodiment, the blanks of corrugated paper composite are converted into ovenable corrugated paper containers using a dwell time of about 60 seconds or less. In another embodiment, the blanks of corrugated paper composite are converted into ovenable corrugated paper containers using a dwell time of about 30 seconds or less. In yet another embodiment, the blanks of corrugated paper composite are converted into ovenable corrugated paper containers using a dwell time of about 10 seconds or less.

These parameters can be combined to provide a desired shape of the ovenable corrugated paper container, depending on, for example, the type of paperboard and adhesives, and the shape. For example, in one embodiment, the blanks of corrugated paper composite are converted into ovenable corrugated paper containers using a dwell time of about 0.01 seconds or more and about 60 seconds or less. In another embodiment, the blanks of corrugated paper composite are converted into ovenable corrugated paper containers using a dwell time of about 0.1 seconds or more and about 30 seconds or less. In yet another embodiment, the blanks of corrugated paper composite are converted into ovenable corrugated paper containers using a dwell time of about 0.2 seconds or more and about 10 seconds or less.

The above-mentioned parameters can be combined to provide a desired shape of the ovenable corrugated paper container, depending on, for example, the type of paperboard and adhesives, and the shape. For example, in one embodiment, the blanks of corrugated paper composite are converted into ovenable corrugated paper containers under a pressure of about 1,000 lbs. of force or more and about 25,000 lbs. of force or less, at a temperature of about 30° C. or more and about 300° C. or less, using a dwell time of about 0.01 seconds or more and about 60 seconds or less, while about 0% or more and about 50% or less steam is injected into the mold cavity. In another embodiment, the blanks of corrugated paper composite are converted into ovenable corrugated paper containers under a pressure of about 10,000 lbs. of force or more and about 20,000 lbs. of force or less, at a temperature of about 50° C. or more and about 250° C. or less, using a dwell time of about 0.1 seconds or more and about 30 seconds or less while about 1% or more and about 25% or less steam is injected into the mold cavity. In yet another embodiment, the blanks of corrugated paper composite are converted into ovenable corrugated paper containers under a pressure of about 12,000 lbs. of force or more and about 18,000 lbs. of force or less, at a temperature of about 75° C. or more and about 200° C. or less, using a dwell time of about 0.2 seconds or more and about 10 seconds or less, while about 2% or more and about 10% or less steam is injected into the mold cavity.

Referring to FIG. 1, an ovenable corrugated paper container 10 is shown with a food product 12 therein. The ovenable corrugated paper container 10 has a pie pan or circular pan shape, although any shape may be employed.

Figure 2:
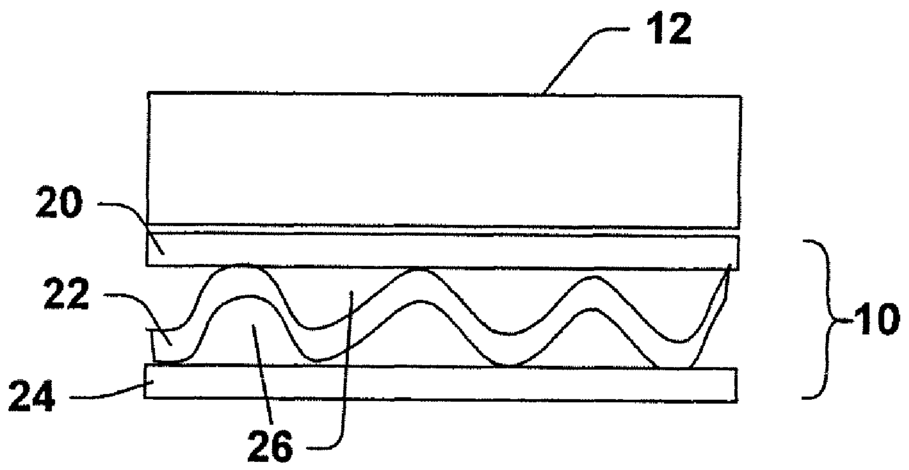
FIG. 2 is an exploded cross-sectional side view of an ovenable corrugated paper container holding a food item in accordance with an aspect of the subject invention.

Referring to FIG. 2, an exploded view of the ovenable corrugated paper container 10 is shown. The ovenable corrugated paper container 10 has a flat inner layer 20 made of a paper substrate and a polymeric coating, a fluted layer 22 made of corrugated paper, and a flat outer layer 24 made of a paper substrate and optional printable top coating. Adhesive may be present between the apexes of the arches of the fluted layer 22 and either the inner layer 20 or the outer layer 24. Air occupies spaces 26, which may provide thermal insulation after a baking operation is completed. That is, a person may handle the ovenable corrugated paper container 10 soon after it is removed from an oven since the air spaces 26 keeps the surface temperature of the outer layer 24 far below the temperature of the food product 12 within the ovenable corrugated paper container 10.

Figure 3:
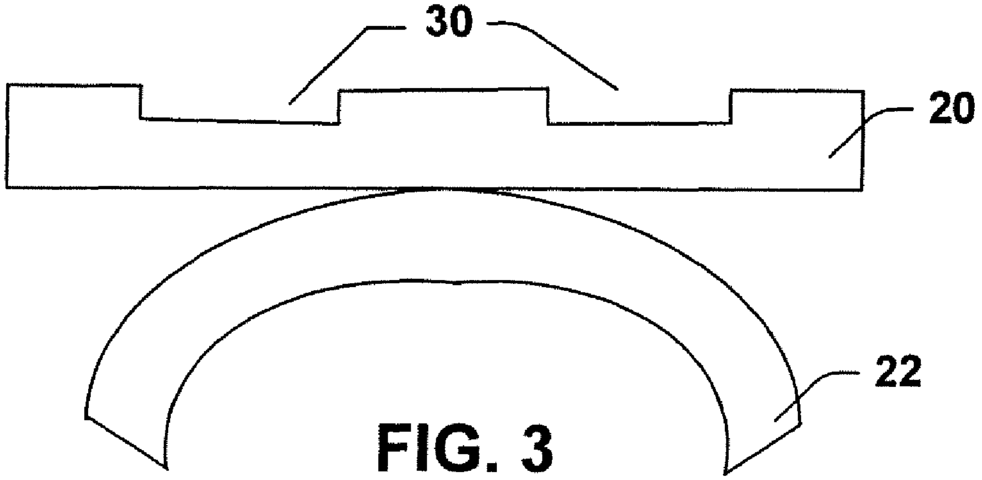
FIG. 3 is another exploded cross-sectional side view of an ovenable corrugated paper container holding a food item in accordance with an aspect of the subject invention.

Referring to FIG. 3, an exploded view of the inner layer 20 of the ovenable corrugated paper container 10 is shown. The inner layer 20 has optional embossing which forms indentations 30. Indentations 30 facilitates the flow of hot air during baking.

The resultant ovenable corrugated paper container is suitable for both cooking or heating food products in an oven at elevated temperatures and for serving the cooked or heated food product without the danger of burning a person handling the container due to the insulation properties. The resultant ovenable corrugated paper container is suitable for not only holding hot food products where the surrounding air is at an ambient temperature but also cooking or heating food products where the surrounding air is heated at elevated temperatures. In accordance with the invention, burning, charring, delamination, melting, wicking, and other degrading events do not occur even when the ovenable corrugated paper container is placed where the surrounding air is heated at elevated temperatures because the ovenable corrugated paper container has the thermoformed, seamless, unlapped, one-piece construction. The ovenable corrugated paper container may be leakproof or waterproof even when the food products with high water content are employed and when the ovenable corrugated paper container is placed where the surrounding air is at elevated temperatures.

The ovenable corrugated paper container may be employed to cook or heat food items at the suitable elevated temperatures depending on, for example, the food product type or how the food is cooked or heated. The ovenable corrugated paper container may be employed to cook or heat food items at elevated temperatures of about 200° F. or more. In another embodiment, the ovenable corrugated paper container may be employed to cook or heat food items at elevated temperatures of about 250° F. or more. In another embodiment, the ovenable corrugated paper container may be employed to cook or heat food items at elevated temperatures of about 275° F. or more.

In one embodiment, the ovenable corrugated paper container may be employed to cook or heat food items at elevated temperatures of about 600° F. or less. In another embodiment, the ovenable corrugated paper container may be employed to cook or heat food items at elevated temperatures of about 550° F. or less. In another embodiment, the ovenable corrugated paper container may be employed to cook or heat food items at elevated temperatures of about 500° F. or less.

These parameters can be combined to provide a desired cooked or heated food products, depending on, for example, the food product type or how the food is cooked or heated. For example, the ovenable corrugated paper container may be employed to cook or heat food items at elevated temperatures of about 200° F. or more and about 600° F. or less. In another embodiment, the ovenable corrugated paper container may be employed to cook or heat food items at elevated temperatures of about 250° F. or more and about 550° F. or less. In another embodiment, the ovenable corrugated paper container may be employed to cook or heat food items at elevated temperatures of about 275° F. or more and about 500° F. or less.

The ovenable corrugated paper container may be employed to cook or heat food items at elevated temperatures of about 260° F. or more and about 600° F. or less. In another embodiment, the ovenable corrugated paper container may be employed to cook or heat food items at elevated temperatures of about 280° F. or more and about 590° F. or less. In another embodiment, the ovenable corrugated paper container may be employed to cook or heat food items at elevated temperatures of about 300° F. or more and about 580E° F. or less.

Notably, in one embodiment, the ovenable corrugated paper container may be employed to cook or heat food items at elevated temperatures of about 375° F. or more. In another embodiment, the ovenable corrugated paper container may be employed to cook or heat food items at elevated temperatures of about 425° F. or more. In yet another embodiment, the ovenable corrugated paper container may be employed to cook or heat food items at elevated temperatures of about 450° F. or more.

The ovenable corrugated paper container may be employed to cook or heat food items at the elevated temperatures for suitable time period depending on the food product type or how the food is cooked or heated. The ovenable corrugated paper container may be employed to cook or heat food items at the elevated temperatures for about 3 minutes or more. In another embodiment, the ovenable corrugated paper container may be employed to cook or heat food items at the elevated temperatures for about 5 minutes or more. In another embodiment, the ovenable corrugated paper container may be employed to cook or heat food items at the elevated temperatures for about 10 minutes or more.

The ovenable corrugated paper container may be employed to cook or heat food items at the elevated temperatures for about 3 hours or less. In another embodiment, the ovenable corrugated paper container may be employed to cook or heat food items at the elevated temperatures for about 2 hours or less. In another embodiment, the ovenable corrugated paper container may be employed to cook or heat food items at the elevated temperatures for about 1 hour or less. These parameters can be combined to provide a desired cooked or heated food products, depending on, for example, the food product type or how the food is cooked or heated. For example, the ovenable corrugated paper container may be employed to cook or heat food items at the elevated temperatures for about 3 minutes or more and about 3 hours or less. In another embodiment, the ovenable corrugated paper container may be employed to cook or heat food items at the elevated temperatures for about 5 minutes or more and about 2 hours or less. In another embodiment, the ovenable corrugated paper container may be employed to cook or heat food items at the elevated temperatures for about 10 minutes or more and about 1 hour or less.

The above-mentioned parameters can be combined to provide a desired cooked or heated food products, depending on, for example, the food product type or how the food is cooked or heated. For example, the ovenable corrugated paper container may be employed to cook or heat food items at elevated temperatures of about 200° F. or more and about 600° F. or less for about 3 minutes or more and about 3 hours or less. In another embodiment, the ovenable corrugated paper container may be employed to cook or heat food items at elevated temperatures of about 250° F. or more and about 550° F. or less for about 5 minutes or more and about 2 hours or less. In another embodiment, the ovenable corrugated paper container may be employed to cook or heat food items at elevated temperatures of about 275° F. or more and about 500° F. or less for about 10 minutes or more and about 1 hour or less.

The ovenable corrugated paper container is suitable for use in any oven. Examples of ovens include conventional ovens, convection ovens, microwave ovens, hybrid convection-microwave ovens, conventional-microwave ovens, toaster ovens, stone ovens, clay ovens, and the like.

The food products that may be cooked or heated in the ovenable corrugated paper container are those that conventionally cooked in an oven. Examples of food products include breads, fish, meats, pastas, pizza, vegetables, sandwiches, pies, cakes, brownies, cookies, pastries, and the like.

When cooking a dough containing food product in the ovenable corrugated paper container, it may be beneficial to include a dough additive or to sprinkle a moisture absorbent in the ovenable corrugated paper container (before placing the dough containing food product into the container) to facilitate formation a crisp dough. In this connection, dough containing food products include breads, pizza, pastries, pies, cakes, brownies, and cookies. Examples of dough additive and moisture absorbents include corn meal, a product under the trade designation Pizza Crisp™ available from Pizza Crisp International, Ltd. and a product under the trade designation Krisp-It available from Krisp-It, Ltd.

A lid may be constructed of the ovenable corrugated paper container. Optionally, a lid may have the same construction except that the inner liner of the lid does not require the polymeric coating and may be constructed of a lower weight paper substrate, similar to those of the fluted layer and the outer layer. The lid may be shaped to detachably fit over the ovenable corrugated paper container. The lid may have holes positioned therein, or the lid may be scored so that a subsequent user may open ventilation holes.

It is to be understood that any numerical figure of a given parameter may be combined with a different numerical figure of the same parameter to form a range for the given parameter.

The following examples illustrate the subject invention. Unless otherwise indicated in the following examples and elsewhere in the specification and claims, all parts and percentages are by weight, all temperatures are in degrees Centigrade, and pressure is at or near atmospheric pressure.

Example 1

A corrugated paper composite is provided with a flat inner layer made of a 60 P/MSF paper substrate and a PET coating, a fluted layer made of 20 P/MSF corrugated paper, and a flat outer layer made of a 26 P/MSF paper substrate and top coating of a PCL500 water based lubricant available from Michelman, Inc. A starch adhesive is used between the apexes of the arches of the fluted layer and the inner layer and the outer layer.

The corrugated paper composite is die cut into circles. The circular corrugated paper composites are converted into ovenable corrugated paper containers under 14,000 lbs. force, and at about 150° C. with a dwell time of about 0.5 seconds using a forming machine.

Example 2

A corrugated paper composite is provided with a flat inner layer made of a 69 P/MSF paper substrate and a PMP coating, a fluted layer made of 26 P/MSF corrugated paper, and a flat outer layer made of a 20 P/MSF paper substrate and top coating of a PCL500 water based lubricant available from Michelman, Inc. A starch adhesive is used between the apexes of the arches of the fluted layer and the inner layer and the outer layer.

The corrugated paper composite is die cut into circles. The circular corrugated paper composites are converted into ovenable corrugated paper containers under 16,000 lbs. force, and at about 175° C. with a dwell time of about 0.5 seconds using a forming machine.

Example 3

A corrugated paper composite is provided with a flat inner layer made of a 99 P/MSF paper substrate and an aqueous coating, a fluted layer made of 7 P/MSF corrugated paper, and a flat outer layer made of a 69 P/MSF paper substrate and top coating of a sulfated tall oil fatty acid. A starch adhesive is used between the apexes of the arches of the fluted layer and the inner layer and the outer layer. The aqueous coating contains styrene-acrylic latex copolymer (styrene:maleic anhydride copolymer, methylmethacrylate, and ethylhexacrylate), calcium stearate, silicone (Silicone 175 from Dow Corning), and water.

The corrugated paper composite is die cut into circles. The circular corrugated paper composites are converted into ovenable corrugated paper containers under 18,000 lbs. force, and at about 170° C. with a dwell time of about 0.5 seconds using a forming machine.

Example 4

A corrugated paper composite is provided with a flat inner layer made of a 60 P/MSF paper substrate and a PET coating, a fluted layer made of 20 P/MSF corrugated paper, and a flat outer layer made of a 26 P/MSF paper substrate and top coating of a PCL500 water based lubricant available from Michelman, Inc. A starch adhesive is used between the apexes of the arches of the fluted layer and the inner layer and the outer layer.

The corrugated paper composite is die cut into circles. The circular corrugated paper composites are converted into ovenable corrugated paper containers under 13,000 lbs. force, 4% injected steam, and at about 160° C. with a dwell time of about 0.25 seconds using a forming machine.

Example 5

A corrugated paper composite is provided with a flat inner layer made of a 69 P/MSF paper substrate and a PMP coating, a fluted layer made of 26 P/MSF corrugated paper, and a flat outer layer made of a 20 P/MSF paper substrate and top coating of a PCL500 water based lubricant available from Michelman, Inc. A starch adhesive is used between the apexes of the arches of the fluted layer and the inner layer and the outer layer.

The corrugated paper composite is die cut into circles. The circular corrugated paper composites are converted into ovenable corrugated paper containers under 16,000 lbs. force, 7% injected steam, and at about 175° C. with a dwell time of about 0.5 seconds using a forming machine.

Example 6

A corrugated paper composite is provided with a flat inner layer made of a 99 P/MSF paper substrate and an aqueous coating, a fluted layer made of 7 P/MSF corrugated paper, and a flat outer layer made of a 69 P/MSF paper substrate and top coating of a sulfated tall oil fatty acid. A starch adhesive is used between the apexes of the arches of the fluted layer and the inner layer and the outer layer. The aqueous coating contains styrene-acrylic latex copolymer (styrene:maleic anhydride copolymer, methylmethacrylate, and ethylhexacrylate), calcium stearate, silicone (Silicone 175 from Dow Corning), and water.

The corrugated paper composite is die cut into circles. The circular corrugated paper composites are converted into ovenable corrugated paper containers under 17,000 lbs. force, 9% injected steam, and at about 180° C. with a dwell time of about 0.75 seconds using a forming machine.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An ovenable container that can be exposed to temperatures of about 200° F. to about 600° F. comprising an inner liner, an outer liner and a single corrugated paper layer positioned between said inner and outer liners; said inner and outer liners formed of a non-corrugated paper substrate; said outer liner having an upper and lower surface, said outer liner having a weight of about 1 to about 100 pounds per thousand square feet, said lower surface of said outer liner forming a bottom surface of said ovenable container; said inner liner having a lower surface, said inner liner is formed of a base portion and a rim, said rim connected to and fully encircling said base portion of said inner liner, said base portion of said inner liner generally planar, said rim extending upwardly from a peripheral edge of said base portion of said inner liner, and wherein an upper surface of said rim and an upper surface of said base portion, and said connection between said rim and said base portion of said inner liner are absent a seam, and wherein said upper surface of said rim and said base portion of said inner liner are designed to engage a food product that is placed on said ovenable container, said inner liner having a weight of about 25 to about 150 pounds per thousand square feet; said upper surface of said inner liner including a polymeric coating, said polymeric coating designed to engage a food product that is placed on said ovenable container and to inhibit the food product from sticking to said ovenable container while the food is heated on said ovenable container, said polymeric coating including one or more polymers selected from the group consisting of polyethylene terephthalate, polybutylene terephthalate and polymethylpentene; said single corrugated paper layer having a weight of about 1 to about 100 pounds per thousand square feet, said weight of said inner liner greater than said weight of said outer liner, said weight of said inner liner greater than said weight of said corrugated paper layer, said single corrugated paper layer at least partially connected to said upper surface of said outer liner and to said lower surface of said inner liner by an adhesive that includes starch.

2. The ovenable container as defined in claim 1, wherein said upper surface of said inner liner is embossed to create indentations having a surface that is below a plane of said upper surface of said inner liner, said embossed upper surface allowing air to circulate underneath food positioned in said upper layer of said inner liner during heating of the food.

3. The ovenable container as defined in claim 1, wherein said inner liner has a weight of about 50 to about 100 pounds per thousand square feet, said outer liner has a weight of about 10 to about 70 pounds per thousand square feet, said corrugated paper layer has a weight of about 10 to about 70 pounds per thousand square feet.

4. The ovenable container as defined in claim 2, wherein said inner liner has a weight of about 50 to about 100 pounds per thousand square feet, said outer liner has a weight of about 10 to about 70 pounds per thousand square feet, said corrugated paper layer has a weight of about 10 to about 70 pounds per thousand square feet.

5. The ovenable container as defined in claim 1, wherein said polymeric coating in applied to said upper surface of said inner liner in an amount of about 0.1 to about 20 pounds per thousand square feet.

6. The ovenable container as defined in claim 4, wherein said polymeric coating in applied to said upper surface of said inner liner in an amount of about 0.1 to about 20 pounds per thousand square feet.

7. The ovenable container as defined in claim 6, wherein said polymeric coating in applied to said upper surface of said inner liner in an amount of about 2 to about 12 pounds per thousand square feet.

8. The ovenable container as defined in claim 1, wherein said adhesive is only formed of said starch, said starch including one or more modified starches selected form the group consisting of hypochloriteoxidized starch, acid-thinned starch, ethylated starch, cross-bonded starch, cationic starch, acetylated starch and starch monophosphates.

9. The ovenable container as defined in claim 7, wherein said adhesive is only formed of said starch, said starch including one or more modified starches selected form the group consisting of hypochloriteoxidized starch, acid-thinned starch, ethylated starch, cross-bonded starch, cationic starch, acetylated starch and starch monophosphates.

10. The ovenable container as defined in claim 1, wherein said corrugated paper layer has a flute pattern selected from the group consisting of E flute, F flute and N flute.

11. The ovenable container as defined in claim 9, wherein said corrugated paper layer has a flute pattern selected from the group consisting of E flute, F flute and N flute.

12. The ovenable container as defined in claim 1, wherein at least a portion of said inner liner, said outer liner and said single corrugated paper layer are thermoformed so that said inner liner, said outer liner and said single corrugated paper layer resist burning, charring, and delamination when exposed to temperatures of about 200° F. to about 600° F.

13. The ovenable container as defined in claim 11, wherein at least a portion of said inner liner, said outer liner and said single corrugated paper layer are thermoformed so that said inner liner, said outer liner and said single corrugated paper layer resist burning, charring, and delamination when exposed to temperatures of about 200° F. to about 600° F.

14. An ovenable container that can be exposed to temperatures of about 200° F. to about 600° F. consisting of an inner liner, an outer liner, a single corrugated paper layer positioned between said inner and outer liners, and a polymeric coating positioned; said inner and outer liners formed of a non-corrugated paper substrate, said outer liner having an upper and lower surface, said outer liner having a weight of about 10 to about 70 pounds per thousand square feet, said lower surface of said outer liner forming a bottom surface of said ovenable container; said inner liner having a lower surface, said inner liner is formed of a base portion and a rim, said rim connected to and fully encircling said base portion of said inner liner, said base portion of said inner liner generally planar, said rim extending upwardly from a peripheral edge of said base portion of said inner liner, and wherein an upper surface of said rim and an upper surface of said base portion, and said connection between said rim and said base portion of said inner liner are absent a seam, and wherein said upper surface of said rim and said base portion of said inner liner are designed to engage a food product that is placed on said ovenable container, said inner liner having a weight of about 50 to about 100 pounds per thousand square feet; said polymeric coating coated on said upper surface of said base portion and rim of said inner liner, said polymeric coating designed to engage a food product that is placed on said ovenable container and to inhibit the food product from sticking to said ovenable container while the food is heated on said ovenable container, said polymeric coating including one or more polymers selected from the group consisting of polyethylene terephthalate, polybutylene terephthalate and polymethylpentene, said polymeric coating applied to said upper surface of said inner liner in an amount of about 2 to about 12 pounds per thousand square feet; said single corrugated paper layer having a weight of about 10 to about 70 pounds per thousand square feet, said single corrugated paper layer having a flute pattern selected from the group consisting of E flute, F flute and N flute; said weight of said inner liner greater than said weight of said outer liner, said weight of said inner liner greater than said weight of said corrugated paper layer; said single corrugated paper layer at least partially connected to said upper surface of said outer liner and to said lower surface of said inner liner by an adhesive that is only formed of a starch, said starch including one or more modified starches selected form the group consisting of hypochloriteoxidized starch, acid-thinned starch, ethylated starch, cross-bonded starch, cationic starch, acetylated starch and starch monophosphates; said inner liner, said outer liner and said single corrugated paper layer thermoformed into a final shape of said container.

15. The ovenable container as defined in claim 14, wherein said upper surface of said inner liner is embossed to create indentations having a surface that is below a plane of said upper surface of said inner liner, said embossed upper surface allowing air to circulate underneath food positioned in said upper layer of said inner liner during heating of the food.

* * * * *